W. E. SIMPSON.
TROLLEY.
APPLICATION FILED NOV. 29, 1920.
1,428,613.
Patented Sept. 12, 1922.
2 SHEETS—SHEET 1.
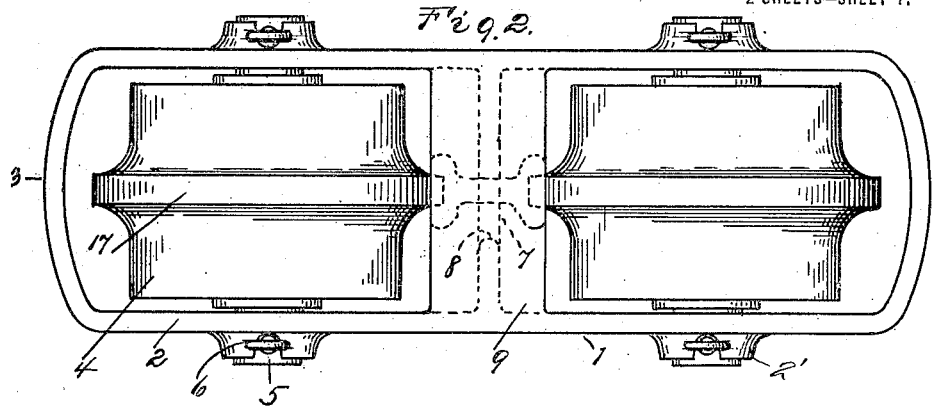
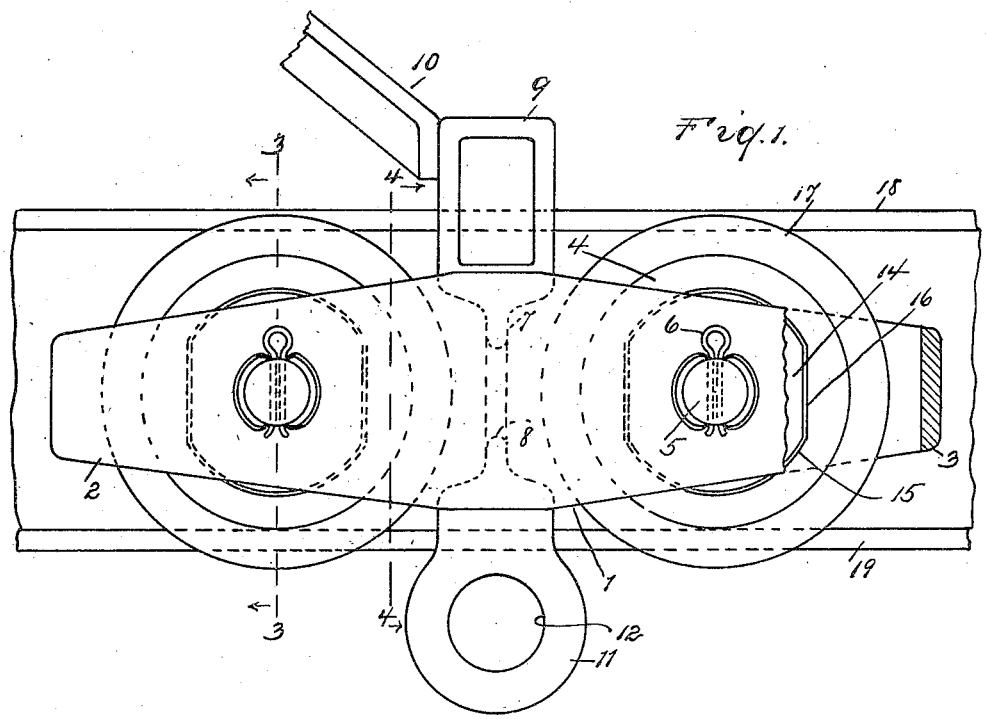
Inventor
William E. Simpson
By Whittemore Hulbert & Whittemore
Attorneys

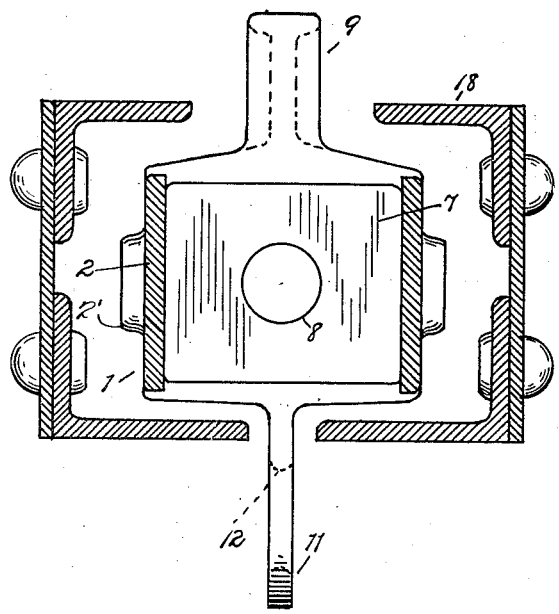
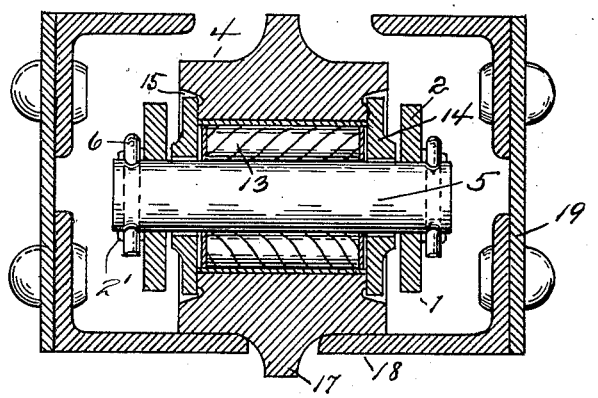

Patented Sept. 12, 1922.

1,428,613

UNITED STATES PATENT OFFICE.

WILLIAM E. SIMPSON, OF DETROIT, MICHIGAN, ASSIGNOR TO PALMER-BEE COMPANY, OF DETROIT, MICHIGAN, A CORPORATION OF MICHIGAN.

TROLLEY.

Application filed November 29, 1920. Serial No. 426,973.

*To all whom it may concern:*

Be it known that I, WILLIAM E. SIMPSON, a subject of the King of Great Britain and Ireland, residing at Detroit, in the county of Wayne and State of Michigan, have invented certain new and useful Improvements in Trolleys, of which the following is a specification, reference being had therein to the accompanying drawings.

The invention relates to trolleys and more particularly to that type designed for use in conveyor systems. One object of the invention is the provision of a trolley having a simple form of frame provided with an abutment for engagement of a driver and a load sustaining lug. Another object is to so construct and arrange the parts of the trolley that different forms of track may be successfully used. Further objects of the invention reside in the novel features of construction as more fully hereinafter set forth.

In the drawings:

Figure 1 is a side elevation of a portion of a conveyor system showing the trolley embodying my invention;

Figure 2 is a top plan view of the trolley;

Figures 3 and 4 are respectively cross sections on the lines 3—3 and 4—4 of Figure 1.

The trolley has the frame 1 formed of the spaced side bars 2 and the end bars 3 integral therewith. 4 are trolley wheels embraced by the frame and rotatably mounted upon the pins 5 extending between the side bars 2 and non-rotatably secured thereto by means of the cotter pins 6 extending through the pins 5 and the bearings 2′ projecting laterally from the side bars 2. The cotter pins also prevent longitudinal displacement of the pins.

For the purpose of re-inforcing the side bars of the frame, there is the cross web 7 intermediate the trolley wheels 4 and connecting the side bars 2. This web has an I-shaped vertical cross section, and also has the aperture 8 through its middle or neutral axis for lightening the frame. 9 is an extension at the middle of the upper edge of the cross web 7 and integral therewith, this extension projecting above the upper surfaces of the trolley wheels and forming an abutment for engagement of the driver 10 which is secured to a suitable conveyor chain (not shown). The horizontal cross section of the abutment 9 is I-shaped with the longitudinal axis of the I extending longitudinally of the frame of the trolley. The end of the I is engageable by the driver and the arrangement is such that the abutment is greatly reinforced and at the same time, the frame of the trolley is reinforced to easily carry the stress. Depending from the middle of the lower edge of the cross web 7 and integral therewith is the load sustaining lug which has the eye 12 therethrough adapted for engagement with the load carrier.

The trolley wheels 4 are rotatably mounted upon the pins 5, anti-friction bearings 13 being preferably provided. 14 are the end bearing plates for the trolley wheels, surrounding the pins 5 and nonrotatably secured to the trolley wheels. As shown, the trolley wheels 4 have the annular recesses 15 with the flat sides 16 in their opposite ends and the end bearing plates 14 are similarly shaped and engage in these recesses.

The trolley wheels 4 have the central annular flanges 17 which extend between the adjacent edges of the flanges 18 for supporting and guiding the trolley. The load sustaining lug 11 is in substantial alignment with these annular flanges and also extends between the adjacent edges of the flanges 18 so that it will not interfere with the movement of the trolley. Since the abutment 9 is also midway between the sides of the trolley it will permit of using a track 19 with its upper flanges extending inwardly toward each other as well as extending outwardly away from each other.

From the above description, it will be readily seen that I have provided a simple form of trolley frame which can be formed of a casting and which is re-inforced and has a re-inforced abutment for the engagement of the driver. Furthermore, the construction is such that the load sustaining lug and the abutment for engagement of the driver will not interfere with the various types of tracks.

What I claim as my invention is:

1. In a trolley, a frame having spaced side bars, a cross web connecting said side bars and forming a reinforcement therefor, and an abutment for engagement of a driver extending transversely of said web.

2. In a trolley, a frame having spaced side bars, an integral cross web connecting said side bars and forming a reinforcement therefor, said cross web having an I-shaped cross section, and an abutment extending from and integral with said cross web, said abutment having an I-shaped cross section transverse to said cross web, one end of said abutment being adapted for engagement of a driver.

3. In a trolley, the combination with a pair of trolley wheels, of a frame having spaced side bars at opposite ends of said trolley wheels, a cross web intermediate said trolley wheels and connecting said side bars to form a reinforcement therefor, an extension upon one edge of said cross web forming an abutment for engagement of a driver, and a load-sustaining lug upon the opposite edge of said cross web.

4. In a trolley, the combination with a pair of trolley wheels, of a frame having spaced side bars at opposite ends of said trolley wheels, pins upon which said trolley wheels are mounted, extending between said side bars, an integral cross web intermediate said trolley wheels and connecting said side bars, said cross web having an I-shaped vertical cross section, an integral abutment extending from the middle of the upper edge of said cross web, said abutment having an I-shaped cross section extending longitudinally of said frame and an integral load sustaining lug depending from the middle of the lower edge of said cross web.

5. In a trolley, the combination with a pair of trolley wheels, of a frame having spaced side bars at opposite ends of said trolley wheels and integral end bars, said side bars increasing in depth from their ends toward their middles, pins extending between said side bars and upon which said trolley wheels are rotatably mounted, an integral cross web intermediate said trolley wheels and connecting said side bars, an integral extension upon the upper edge of said cross web and at its middle, said extension forming an abutment for engagement of a driver, and an integral load sustaining lug extending from the middle of the lower edge of said cross web.

6. In a trolley, the combination with a frame having spaced side bars and a non-rotatable pin extending therebetween, of a trolley wheel rotatably mounted on said pin, and end bearing plates for said trolley wheel surrounding said pin and non-rotatably secured to said trolley wheel, said plates being held to said trolley wheel by said side bars.

7. In a trolley, the combination with a frame having spaced side bars and a non-rotatable pin extending therebetween, of a trolley wheel rotatably mounted on said pin and having a central annular peripheral flange and annular recesses with flat sides in its opposite ends, and end bearing plates of corresponding shape and held in engagement in said recesses by said side bars.

In testimony whereof I affix my signature.

WILLIAM E. SIMPSON.